(12) United States Patent
Hayes

(10) Patent No.: US 6,341,384 B1
(45) Date of Patent: Jan. 29, 2002

(54) THERMALLY PROTECTIVE LINER

(76) Inventor: Claude Q. C. Hayes, 3737 Third Ave., #308, San Diego, CA (US) 92103

( * ) Notice: Subject to any disclaimer, the term of this patent is extended or adjusted under 35 U.S.C. 154(b) by 31 days.

(21) Appl. No.: 09/626,826

(22) Filed: Jul. 27, 2000

Related U.S. Application Data

(60) Provisional application No. 60/145,776, filed on Jul. 27, 1999.

(51) Int. Cl.⁷ .................................................. A41D 1/00
(52) U.S. Cl. ............................ 2/458; 2/81; 2/97; 2/272
(58) Field of Search ............................... 2/458, 81, 97, 2/272

(56) References Cited

U.S. PATENT DOCUMENTS

| | | | | |
|---|---|---|---|---|
| 4,612,239 A | * | 9/1986 | Dimanshteyn | 428/246 |
| 4,690,859 A | * | 9/1987 | Porter et al. | 428/251 |
| 4,746,565 A | * | 5/1988 | Bafford et al. | 428/251 |
| 5,830,319 A | * | 11/1998 | Landin | 162/159 |
| 6,004,662 A | * | 12/1999 | Buckley | 428/304.4 |
| 6,125,645 A | * | 10/2000 | Horn | 62/259.3 |

FOREIGN PATENT DOCUMENTS

| WO | WO-01/06881 A1 | * | 2/2001 | ............ A41D/1/00 |
|---|---|---|---|---|

\* cited by examiner

*Primary Examiner*—John J. Calvert
*Assistant Examiner*—Robert H. Muromoto, Jr.
(74) *Attorney, Agent, or Firm*—Bauer & Schaeffer, LLP

(57) ABSTRACT

A thermally protective liner for use with thermally protective garments comprising a polymer and an endothermic agent distributed, dispersed and suspended within said polymer, said endothermic agent being capable of absorbing amounts of heat equivalent to its latent heat of reaction or fusion, whereby the thermal protective performance of said garments is increased and enhanced.

55 Claims, 9 Drawing Sheets

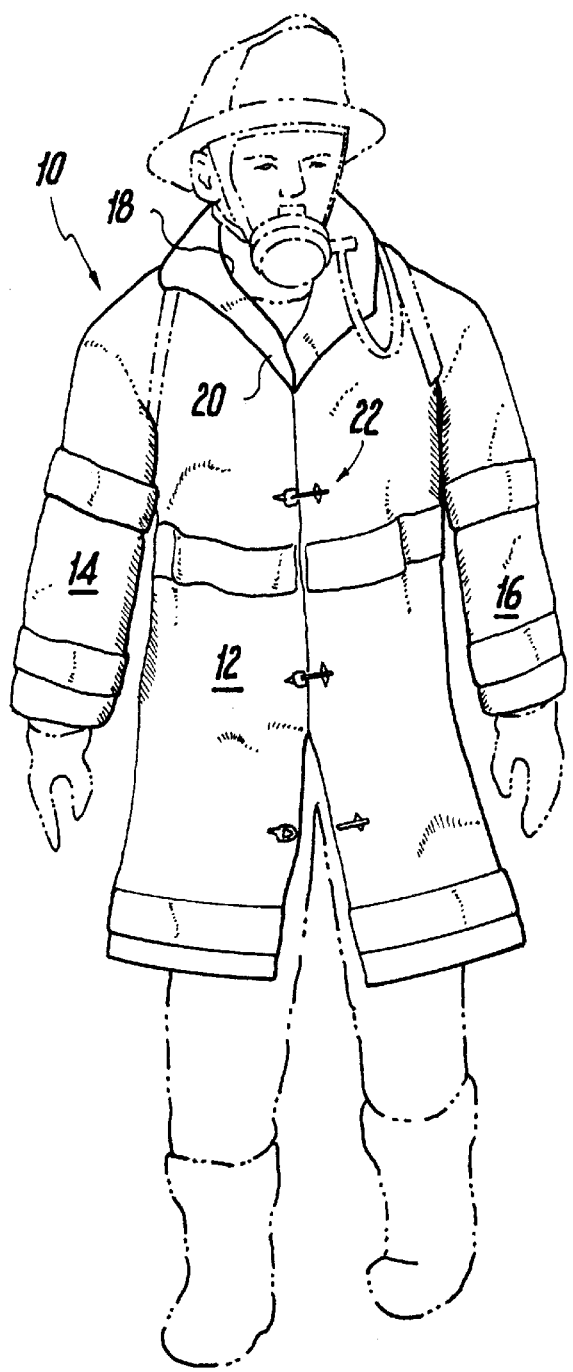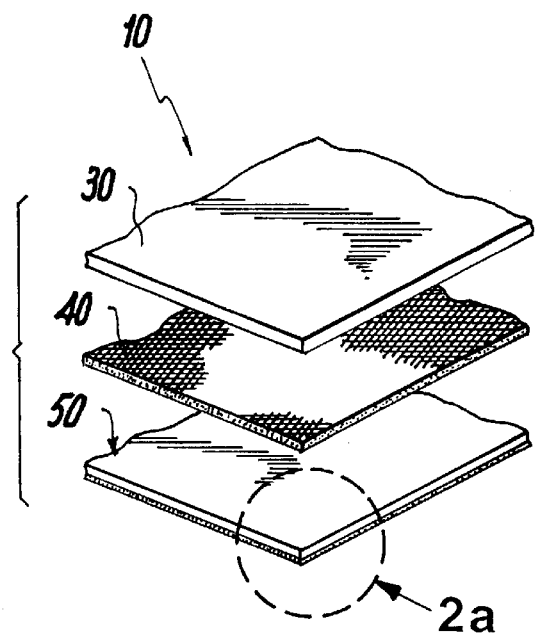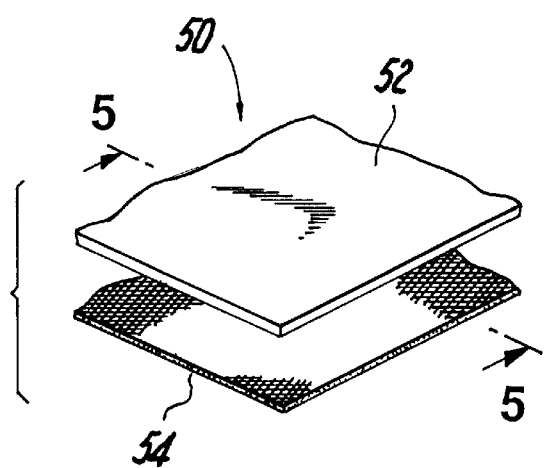
Fig. 1
Fig. 2
Fig. 2a

THERMALLY PROTECTIVE LINER

RELATED APPLICATION

The present invention is related to Provisional Application Ser. No. 60/145,776, filed Jul. 27, 1999, entitled THERMAL CONTROL FABRIC/MATERIAL/FILM.

FIELD OF THE INVENTION

The present invention relates to a new thermally protective liner which can be used as an inner, outer or intermediate liner in protective garments designed to protect the wearer from hazardous environmental conditions. More particularly, the present invention relates to a new thermally protective liner which (i) is extremely thin, perspiration permeable, and breathable; (ii) provides the wearer with the best protection possible from high external heat by supplying a significantly higher Thermal Protective Performance value in a thinner format; and (iii) provides the suit designer with the ability to design specify the water vapor ventilation, the thermal protective performance (TPP), the thickness, and the weight, thereby rendering protective garments lighter, thinner and more efficacious than those currently available.

BACKGROUND OF THE INVENTION

Protective garments are designed to shield the wearer from a variety of environmental hazards such as heat and fire. Fire fighter garments as well as garments worn by individuals working on high voltage power lines, are representative of such garments.

Fire, in particular, is a very dangerous element. It moves and spreads quickly, putting lives and property in danger in a very short period of time; including the very lives of those fighting the fire. Consequently, fire fighters must themselves be properly protected, while at the same time be provided with tools and garments that allow them to move with tremendous speed and alacrity, while simultaneously allowing them to maintain their strength and stamina.

Accordingly, the qualities most desirable in fire fighters' garments as well as other thermal control garments are minimum weight, maximum flexibility, high thermal protection, vapor ventilation, tensile strength and minimum water absorption.

Thermally protective garments and more particularly, fire fighters' garments basically comprise three layers: (a) an outer shell, (b) an inner liner, including a moisture barrier, and (c) a thermally protective liner; traditionally insulation.

The outer shell basically consists of a fabric of aramid fibers such as NOMEX®, KEVLAR® (both registered trademarks of E. I. DuPont) or a NOMEX®/KEVLAR® blend which provides resistance to abrasion, some thermal resistance, and structural integrity.

The moisture barrier, which usually is located right next to the outer shell, basically consists of a membrane of GORETEX® (a registered trademark of W. L. Gore & Associates, Inc.) material. The GORETEX® material has micropores, which permit the transport of moisture vapor, thereby allowing the perspiration moisture vapor of the wearer to escape outwardly; but which are sufficiently small to prevent liquid moisture from passing through to the wearer from the outside.

Finally, the thermally protective liner comprises an insulation layer of spun carbon, NOMEX, KEVLAR fibers, or a batting of any combination of such fibers, often quilted to a lightweight NOMEX face cloth. The batting of the thermal barrier traps air and possesses sufficient loft to provide the necessary thermal resistance, while the face cloth provides resistance to abrasion of the thermal liner by the wearer, and provides structural integrity and tensile strength to the insulation layer.

The prior art has many disadvantage and drawbacks. Specifically, in order to increase the Thermal Protective Performance (TPP) value of the prior art, one would have to use a thicker layer of insulation. In so doing, the wearer of the prior art would experience an increased weight, increased "hobbling" effect, a decreased mobility and a decreased drapeability and a diminished flexibility. Furthermore, as a result to the increased thickness of the insulation, there will be an increase in the capillary action, which in turn will result in the absorption of water vapor. This absorption of water vapor will make the suit heavier and less wearable; increase fatigue; and under certain circumstances or rare high heat, the excess water trapped in the insulation could adversely affect the insulation's Thermal Protective Performance value.

In summary therefore, the additional bulk and loft provided by the fabric thermal liner of the prior art inhibits the freedom of movement of the wearer, producing a "hobbling effect", thereby increasing the stress imposed on the wearer in a situation requiring high activity and accelerating the onset of the wearer's fatigue. This "hobbling effect" becomes particularly pronounced when the fabric thermal liners are excessively thick.

The replacement of this thermal liner, as described above with an Aldridge et. al. U.S. Pat. No. 5,136,723 open mesh insulation thermal barrier will still impede the transport of moisture vapor. Nor will the replacement of this thermal liner with the Aldridge U.S. Pat. No. 5,697,101 apertured closed cell foam material, will resolve the above referenced disadvantages and drawbacks.

First, closed-cell foam is stiff. Accordingly, even at minimum thicknesses a closed-cell foam thermal liner will be bulky, and unmanageable. Thus, the use of a closed-cell foam thermal liner in thermal protective garments, such as fire fighters' garments will continue to produce the "hobbling effect" produced by bulkier materials, and to contribute to the stress and fatigue of the wearer.

Second, in order for perspiration to escape to the outside, the closed-cell foam thermal liner must be perforated by as much as 45% of the total surface area of the liner. When 45% of the area is perforated, it leaves only 55% of effective closed-cell foam insulation for the liner. This means that as a function of the loss of 45% insulation, the TPP of said thermal liner drops dramatically. As the TPP drops, it limits the thinness of the closed-cell foam thermal liner and mandates the formation of a thicker closed-cell foam thermal liner to compensate for the loss of TPP.

Since, the closed-cell foam thermal liner will have to be made thicker to compensate for the loss of TPP, it will be bulkier and less flexible if it is to be used for protection from extreme heat exposure. Accordingly, it will have minimum use in situations where the wearer still needs flexible drapeable garments but more than adequate protection from extreme heat. Furthermore, it will fail miserably in reducing the "hobbling effect" usually associated with thermal protective garments.

It is, therefore, an object of the present invention to provide a flexible, drapeable thermally protective liner capable of significantly reducing the "hobbling effect" produced by bulkier thermal liner materials, thereby diminishing the stress and fatigue on the wearer.

It is another object of the present invention to provide a very thin thermally protective liner capable of meeting and exceeding the National Fire Protection Association's (hereinafter "N.F.P.A.") requirements for sufficient thermal insulation and protection, in extreme high heat conditions.

It is another object of the present invention to provide a very thin thermally protective, endothermic liner capable of both protecting the wearer and remaining stable and effective under extreme environmental situations.

It is another object of the present invention to provide an endothermic flexible material suitable for apparel and clothing having the ability to absorb high amounts of heat and protecting the wearer of such clothing when exposed to extreme environments of heat.

It is another object of the present invention to provide an endothermic material for applications requiring a material to be thin, flexible, drapeable, conformable, breathable, lightweight and comfortable, while simultaneously protecting and insulating against high heat environments.

It is another object of the invention to provide a thermally protective liner and/or endothermic flexible material/fabric which can be appropriately and easily modified to meet design specifications as determined by specific applications.

SUMMARY OF THE INVENTION

According to the present invention there is provided a thinner, lighter, flexible, drapeable, conformable, breathable, and more comfortable thermally protective liner for use in thermally protective garments capable of replacing the currently available thermal liners and capable of providing higher TPP values. The inventive thermal liner comprises a PCEA i.e "P"olymer "C"ontaining an "E"ndothermic "A"gent", which is chemically and mechanically processed to form a very thin film, a composite film, a cloth made from PCEA which is either spun, woven, knitted or made from non-woven means or a PCEA fiber/insulation composite, wherein the PCEA fibers are integrated with insulation or other protective fibers. The PCEA, in turn, comprises a polymer and an endothermic agent dispersed, distributed and suspended within the polymer, in design specific concentrations.

The inventive thermally protective liner makes use of the PCEA's suspended endothermic agent's own inherent thermodynamic, physical and chemical properties i.e. its latent heats of fusion, hydration, formation, decomposition, vaporization, sublimation, and/or allotropic and phase change reactions, to absorb massive amounts of heat from the surrounding adverse environment. This absorption of heat is what ends up protecting the wearer of the liner-bearing garment from the extreme heat producing environment.

When the thermally protective liner in the thermoprotective garments comprises a thin PCEA film and breathability of the garments is an issue, then it must be perforated with apertures of variable dimensions. These apertures can include holes. Typically, the total perforation area is 5%–35% of the total surface area of the PCEA layer; and preferably, the perforation area is 20% of the total surface area of the PCEA layer.

In an alternate embodiment of the thermally protective liner, the PCEA layer is a composite film. The composite PCEA film is formed as follows: the PCEA is formulated and deposited on a fabric backing, polymer backing, plastic backing, metalized plastic backing, graphite fabric backing, or any combination thereof. It is deposited in discrete, defined areas, which can be any shape possible and which allow narrow paths to run between them. The narrow paths that run between these defined areas are substantially free of the PCEA and consist of plain polymer, plastic, or fabric matrix backing. Multiple apertures are provided along the narrow paths, which while substantially preventing any capillary leakage of the endothermic agent from the PCEA areas improve the sealing in of the endothermic agent, and provide a path for ventilating water vapor through liner. Simultaneously, such pathways will also improve the drapeability and flexibility of the liner.

Where the thermally protective liner is a cloth made from PCEA which is either spun, woven, knitted or made from non-woven means or a PCEA fiber/insulation composite, wherein the PCEA fibers are integrated with insulation or other protective fibers breathability of the PCEA layer is moot, as apertures are inherent to the methods of preparation of the cloth, or forming of the insulation/batting.

Irrespective of what form the inventive thermally protective liner will take i.e. film, cloth, batting or insulation, it will render thermally protective garments much thinner than ever before, yet better capable of satisfying and exceeding the thermal insulation standards of the National Fire Protection Association. The characteristics that provide these advantages are as follows: First, by virtue of the chemistry of the endothermic agents, in the "p"olymer "c"ontaining "e"ndothermic "a"gent i.e., in the PCEA, the thermally protective liner provides the best and most effective heat absorbing and heat shielding properties when compared to previous insulating materials. In fact, as will be shown below, a PCEA thermally protective liner limits the rate of temperature rise better than any other thermal barrier liner ever used in fire fighters' garments.

Second, the thermally protective liner of the present invention is truly more dimensionally stable and uniform in thickness than any comparable thermal insulation of prior art. Thus, a sheet of the present liner can be made thinner than standard Aralite batting, and still meet and exceed the minimum overall N.F.P.A requirements for thermally protective liners.

Third, the inventive thermal liner itself, does not absorb any water from either the outside or from the wearer. Accordingly, it may be used in conjunction with a much thinner batting insulation or face cloth, which reduces dramatically the water retention of the entire garment.

Thus, the reduction of the conventional batting insulation or face cloth together with the inventive, thinner more thermally protective liner ultimately provides a thermally controlling garment whose overall size and bulk is reduced significantly; whose "hobbling effect" is minimized dramatically; whose wearer's stress and fatigue is reduced remarkably; whose donning and doffing by the wearer is greatly facilitated; and whose thermally protective performance to weight and thickness ratio is maximizable.

The aforementioned objects, as well as others, will be found in detail in the following written disclosure.

BRIEF DESCRIPTION OF THE DRAWING

The figures of the drawing are briefly described as follows:

FIG. 1 is a somewhat schematic, perspective view of a fire fighter garment incorporating an embodiment of the present invention;

FIG. 2 is an exploded, perspective detail of the garment of FIG. 1, showing the layers of material comprising the ensemble and particularly showing the inventive thermal liner comprising a PCEA film;

FIG. 2a is an exploded, perspective detail of the thermal liner of FIG. 2 showing the layers of material comprising the inventive thermal liner i.e. a PCEA film and a thin layer of insulation;

DETAILED DESCRIPTION OF THE PREFERRED EMBODIMENT

Figure 3:
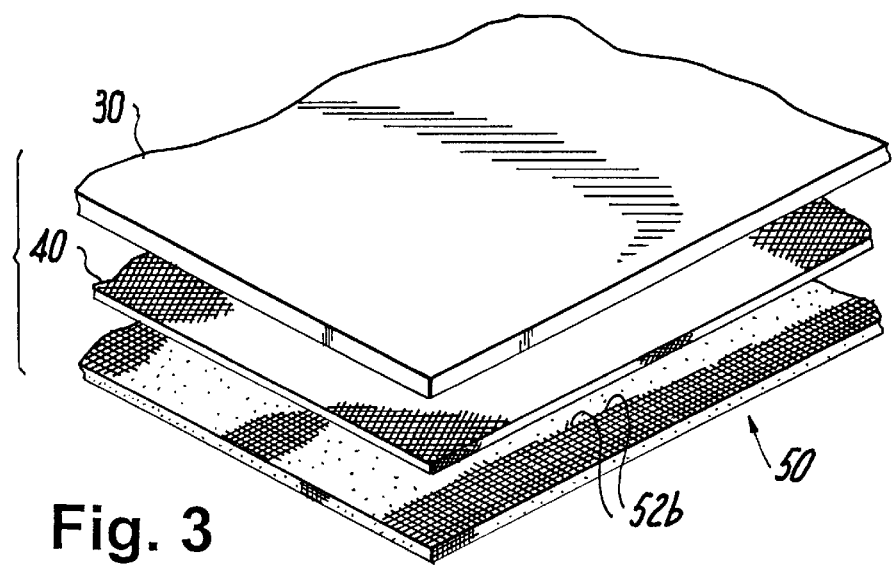
FIG. 3 is an exploded, perspective detail of the garment of FIG. 1, showing the layers of material comprising the ensemble and particularly showing the inventive thermal liner comprising a cloth made from PCEA which is either spun, woven, knitted or made from non-woven means, or a PCEA fiber/insulation composite, wherein the PCEA fibers are integrated with insulation or other protective fibers.

A preferred embodiment of the invention is demonstrated in the example and the example's modifications that follow below. Such example is to be understood to be enabling with respect to the preferred embodiment or invention but is not to be interpreted as restrictive to the scope of appended set of claims.

EXAMPLE

As shown in FIG. 1, the protective thermal barrier of the present invention is embodied in a protective fire fighter garment, designated 10, which is a fire fighter coat having a body portion 12, sleeves 14 and 16, a neck opening 18, a collar 20 surrounding the neck opening, and a front closure 22. The front closure 22 is of a conventional design and may comprise snaps or, alternately, strips of hook and loop fastener material (not shown) in combination with mechanical locking means such as hook and "D" combinations 24.

As shown in FIGS. 1 and 2 the garment 10 includes an outer shell, generally designated 30, of an aramid material such as NOMEX, which covers the entire garment; underlying this outer shell, a moisture barrier shell generally designated 40 typically comprising a thin layer of GORE-TEX® material; and the inventive thermally protect liner, generally designated 50, which extends throughout the garment.

As shown in FIG. 3, the inventive thermally protective liner 50 comprises a thin film or a thin composite film of a "polymer containing an endothermic agent" 52 (hereinafter "PCEA layer") together with at least one thin layer of insulation or batting 54 set up and held together in such a manner as to maximize heat absorption, insulation and maximum wearer perspiration ventilation and breathability. Preferably, the insulation is placed proximately to the PCEA film or adhered thereto. However, it should be noted that a PCEA liner may be placed in any order within a traditional firesuit garment. In fact, it could be placed right next to the outer NOMEX shell, either internally towards the wearer's skin, or externally to the NOMEX, directly exposed to the outside adverse conditions.

Alternatively the internal inventive thermally protective liner 50 may comprise a cloth made from PCEA which is either spun, woven, knitted or made from non-woven means, a PCEA fiber/insulation composite, wherein the PCEA fibers are integrated with insulation or other protective fibers, or a scrim containing PCEA. A thin layer of insulation or batting 54 may or may not be coupled with alternate forms of PCEA.

(a) Formulation of the PCEA Layer

Figure 5:
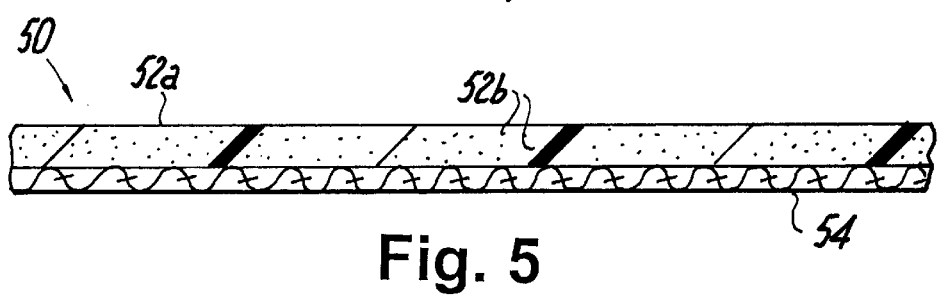
FIG. 5 is a side cross-sectional elevation view of the thermal PCEA liner of FIG. 2a taken along line 5—5, showing the PCEA film and the attached insulation.
Figure 6:
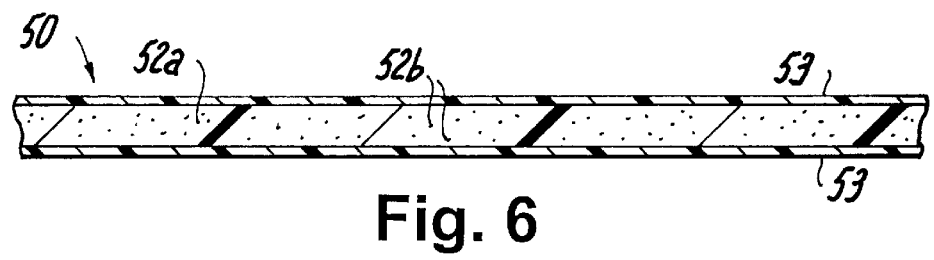
FIG. 6 is a cross-sectional view of an alternate embodiment of a PCEA film, bearing sealing layers on its top and bottom surface.

As was set forth above, the inventive thermally protective liner 50 comprises a thin PCEA layer 52. The PCEA layer as shown in FIG. 5 can comprise a thin PCEA film, a thin composite PCEA film, a cloth made from PCEA which is either spun, woven, knitted or made from non-woven means, a PCEA fiber/insulation composite, wherein the PCEA fibers are integrated with insulation or other protective fibers, or a scrim containing PCEA. The PCEA in turn comprises a "carrier" plastic or polymer matrix 52a and an endothermic agent 52b distributed and suspended therein and throughout the polymer.

The carrier plastic or polymer 52a may comprise any natural or synthetic polymer or a mixture thereof. In turn, such natural and synthetic polymers may comprise: latexes; fluoropolymers such as various TEFLON® species, specifically polytetrafluoroethylene (PTFE), polyfluoroacetate (PFA) and fluoroethylpropylene(FEP) and other fluorinated plastic films having similar thermal stability (FEP –200 DEGREES C. TO 200 DEGREES C., and PFA –200 DEGREES C. TO 250 DEGREES C.) that are well known in the art; expanded TEFLON®; high temperature fluoroelastomers such as VITON® and other highly thermoresistant polymers and plastics well known in the art; elastomers such as SILICONE® species specifically polydimethylsiloxane and polymethylphenylsiloxane and other siloxanes well known in the art; polyimides such as KAPTON®; POLYESTERS® such as MYLAR®; high density polymers such as TIVAR® and SPECTRA®; and other polyamides, polyarylates, polyetherimides, polyketones, polyphenylene oxides or sulfides, polyphenylsulfones, polysulfones, acetals, nylons, ABS, polyetheretherketones, phenolics, polystyrenes, polycarbonates, polyethylenes, polypropylenes, acrylics, polyurethanes, polyvinyls, polyvinylchlorides, cellulose and wood fiber, polymeric and plastic materials well known to those skilled in the art of thermoprotective materials.

Preferably, for firesuit garments the carrier plastic or polymer 52a should be TIVAR®, SPECTRA®, KAPTON®, MYLAR® TEFLON®, SILICONE®, VITON®, or LATEX®. A fire retardant must be added if the polymer or plastic is flammable.

These polymers can be photo, thermally or chemically cured. More importantly however, they have a molecular structure consisting of long chains of mostly linear molecules, which after being relaxed by either controlled heating, dissolution or suspension in a plasticizer or solvent, provide the interstitial spaces, through which the endothermic or exothermic agents weave and are distributed prior to curing and the final formation of the PCEA.

It is noted that the inventive thermal liner 52 can have two(2) forms: (a) a permanent thermal liner; and (b) a disposable thermal liner. The permanent thermal liner comprises a polymer and an non-expendable endotherm, i.e it can be used over and over again. The Disposable thermal liner comprises a polymer and an expendable endotherm, i.e. after at least one use the liner must be removed and replaced with a new one. To facilitate the removal the liners are preferably attached to the outside surface of the thermal protective garments. The means of attachment can be snaps, tape, or hook and loop i.e. VELCRO® flaps. Alternatively, the expendable thermal liner may be internal or external to the garment. External thermal liners, in fact, may be formed into coveralls, and worn to enhance the thermal property of the garments beneath them.

Non-expendable endothermic agents 52b comprise the following: oxidized and unoxidized polymers; oxidized and unoxidized homopolymers of ethylene polymer compounds; carbon monoxide-bonded copolymers; micronized polyethylene waxes such as stearic acid; waxes derived from petroleum; ethylenebis-stearamide; N,N-ethylene-bis-stearamide; various tars; high molecular weight oils and hydrocarbons; polyvinyl alcohols; oxidized and unoxidized polyethylene homopolymers; carnauba wax; and any eutectic blends of any of these materials or families of materials including salts with melting points below 550 degrees Celsius.

Expendable endotherms 52b comprise the following: aluminum hydroxide, calcium hydroxide, potassium hydroxide, lithium hydroxide and the mixtures thereof; boric acid; dodecaborane, paraldehyde, paraformaldehyde, trioxane and the mixtures thereof; lithium formate, lithium acetate, lithium carbonate, calcium carbonate, silicon carbonate, magnesium carbonate, sodium bicarbonate and the mixtures thereof; salts of acetic acid, salts of formic acid, salts of boric acid and the mixtures thereof; lithium chloride trihydrate, lithium nitrate trihydrate, sodium carbonate decahydrate, sodium borate decahydrate, hydrated epsom salts, beryllium sulfate tetrahydrate, sodium phosphate dodecahydrate, calcium chloride hexahydrate, zinc sulfate heptahydrate, magnesium chloride hexahydrate, sodium sulfate decahydrate, aluminum oxide trihydrate, aluminum sulfate decaoctahydrate, aluminum fluoride trihydrate, and the mixtures thereof; and any eutectic mixtures of any of these materials or families of materials including salts with melting points below 550 degrees Celsius.

These agents 52b can be micronized and added to the carrier polymer(s) 52a after said polymers have been relaxed by either controlled heating, dissolution or suspension in a plasticizer or solvent. The agents are then subjected to a mixing process by which they are distributed through and suspended in the polymer(s)' interstitial spaces, and fixed therein through final curing steps, which result in the inventive thermal control composite i.e. the PCEA. The PCEA in turn is chemically and/or mechanically processed via conventional plastics processing methods and means to form a thin PCEA film, a PCEA fiber, a cloth or a batting. Such methods include rolling, evaporating, extruding, curing, spinning, weaving, and knitting. It is these PCEA films, fibers, cloths, batting and insulation, which will make an integral part of the thermally protective liner.

The final and effective concentration of endothermic agents 52b within the PCEA for use in a fire fighters' garment will depend on the form of the PCEA layer ie. whether it is a film, a cloth or a batting, on the carrier plastic or polymer used and on the endotherm used. Thus the final and effective concentration of the endothermic agent in a PCEA film ranges from 0.0001 to 1.2 gram of endothermic agent per square inch of PCEA, wherein the carrier plastic or polymer is a fluoroelastomer the endotherm is a polyethylene polymer, and the PCEA has a thickness of 0.05 to 2.5 mil; with a preferred concentration of 0.01 to 0.08 grams endotherm per square inch of PCEA.

Or, if the carrier plastic or polymer 52a is SILICONE, the concentration of the endothermic agent 52b may range from 5% to 60% endotherm by weight in the PCEA film. Generally speaking, the flexibility and drapeability of the PCEA film is preserved when the endothermic agent 52b concentration is low.

It must be noted, however, that the ultimate effective concentration will be determined on a case by case application basis by such factors as the needed heat capacity of the application, the type of polymer used, the type of endotherm, the particulate size of the endotherm, and the needed flexibility and use of the PCEA.

Figure 4:
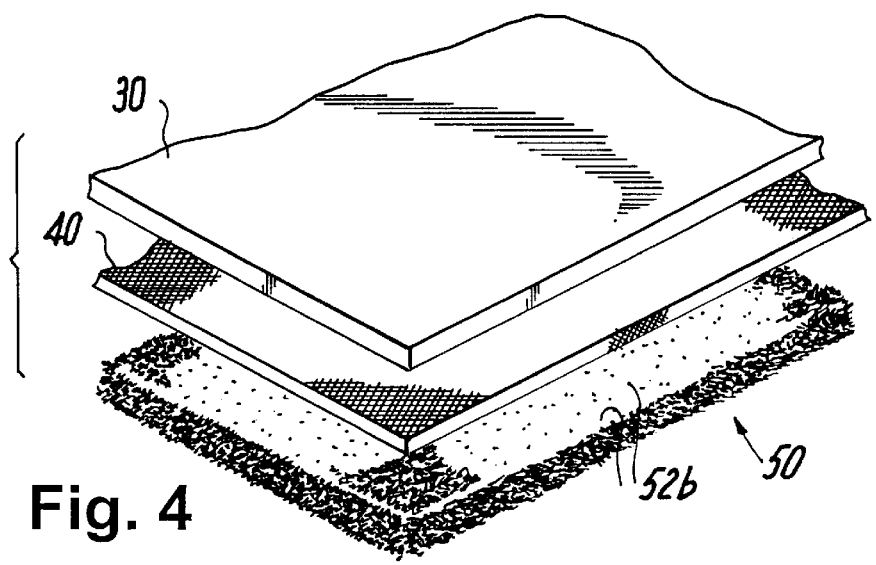
FIG. 4 is an exploded, perspective detail of the garment of FIG. 1, showing the layers of material comprising the ensemble and particularly showing the inventive thermal liner comprising a PCEA fiber/insulation composite, wherein the PCEA fibers are integrated within the insulation.

(b) Physical Characteristics, Assembly and Various Embodiments of the PCEA Layer in the Inventive Fire Garment Liner (i) The simplest embodiment of the inventive thermally protective liner is the PCEA film, illustrated in FIGS. 3 and 4 above. FIG. 4 illustrates the distribution of the endothermic agent 52b throughout the single sheet of PCEA film for use in a thermally protective garment liner. When this type of PCEA film is to be used as a thermally protective liner in thermoprotective garments, and breathability is an issue, the PCEA film must be perforated with holes, perforations, and apertures of variable dimensions. Preferably, the total area of holes, perforations and apertures ranges from 5–35% of the total surface area of the entire PCEA layer/film in order to maintain high Thermal Protection Performance (IPP) values and maximum wearer perspiration permeability and ventilation. It must be noted that should the TPP values drop as a result of the perforations, it is not necessary to compensate by increasing the thickness. One need only replace the endotherm with one having a higher latent heat capacity or increase the concentration of the endotherm in the PCEA, to bring the TPP values of the film back up to acceptable values.

Figure 7:
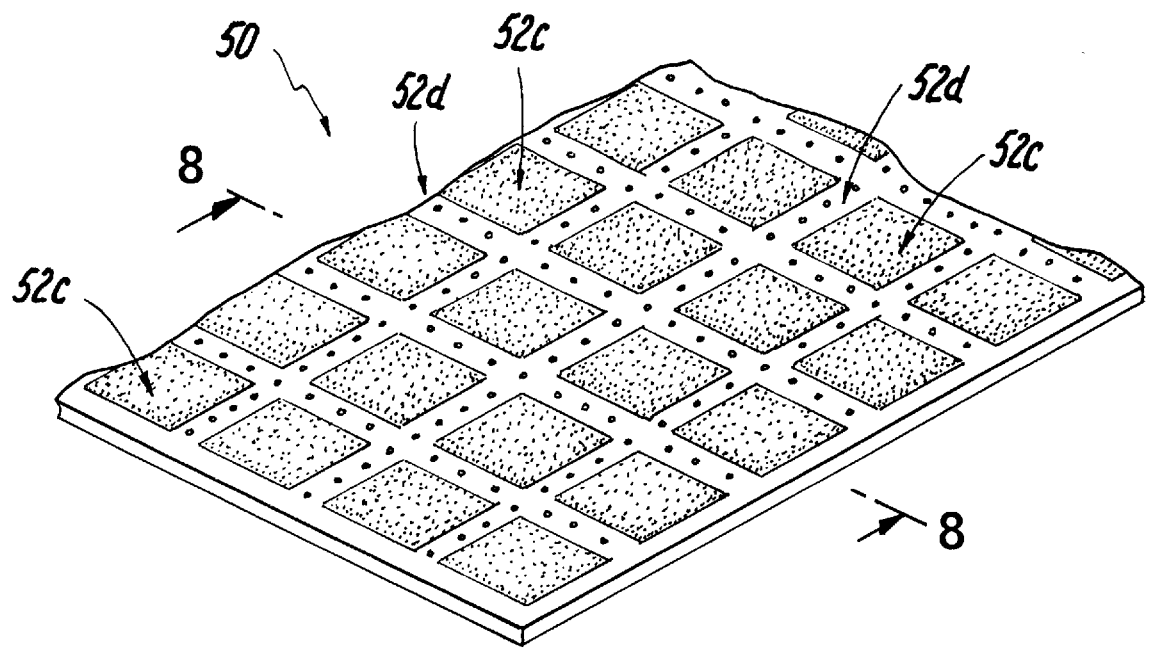
FIG. 7 is a perspective view of a composite PCEA film that illustrates the segmented square-form distribution of the endothermic agent and the intermediary paths that are substantially endothermic agent free.
Figure 8:
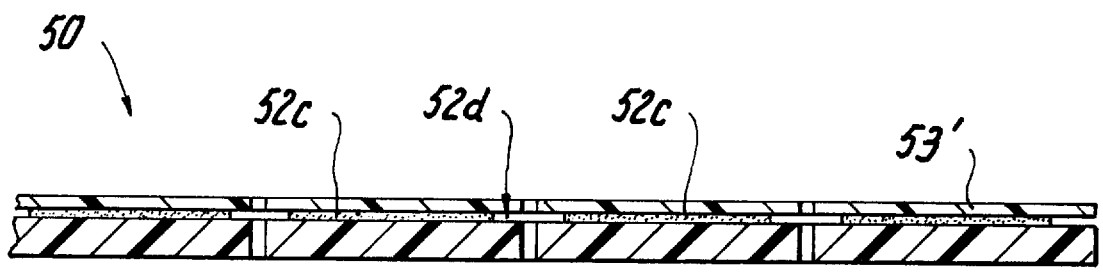
FIG. 8 is a side, cross-sectional view of the composite PCEA film, as shown in FIG. 7, where the top side of the material (the side of the deposited endothermic squares) is in contact with a sealing layer.

(ii) An alternate embodiment of the inventive thermal liner, as illustrated in FIG. 5, is not having one PCEA layer/film with the endotherm distributed throughout. Rather, depending on the polymer/plastic 52a and the endotherm 52b used, the PCEA can be formulated and deposited on a backing in discrete, defined areas 52c. These areas can be any shape possible and will allow narrow paths 52d to run between them. The backing can be a polymer backing, a plastic backing, a fabric backing, a silicate backing, a metal foil, a metalized plastic backing, a graphite fabric backing, a cellulose or any combination thereof. These defined areas can be triangular, circular, square or even free form. The choice of the shape of these discrete defined areas 52c is dictated by the apparatus and tooling, which will be ultimately used to provide the holes, apertures, and perforations discussed above. It has been found that for Applicant's practical considerations the preferred shape for these defined areas is square or hexagonal. FIG. 7 illustrates one of the preferred shapes dictated by Applicant's practical considerations, but, as discussed above, the shape of the defined areas 52c can be any shape.

It is these defined areas, square or otherwise of the PCEA layer that are responsible for the absorption of heat. The narrow paths 52d that run between these defined areas are substantially free of the PCEA and consist of polymer backing, plastic backing, fabric backing, metalized plastic backing, graphite fabric backing matrices, silicate, metal foil, cellulose or any combination thereof. This type of design pattern allows an easy mechanical piercing through the backing film along the narrow paths, for the purpose of making the material perspiration permeable and breathable, while substantially preventing any capillary leakage of the endothermic agent from the PCEA. These narrow paths improve the sealing of the endothermic agent in the PCEA, while still allowing a path for ventilating the liner and still enhancing the liner's drapeability and flexibility.

Alternatively to using an integrated single sheet of PCEA and backing, the defined areas after they are formed and cured on the backing may be cut along the narrow paths and then segmented and sandwiched between at least two layers of insulation material, with quilting thread passing through the insulation layer and between the cut and segmented PCEA backing cut pieces. As such, the stitching will not pierce the PCEA thereby preventing microleakage of the endothermic agent into the capillary structure of any batting or insulating material.

(iii) In certain situations, depending on the carrier plastic or polymer 52a and endothermic agent 52b used to form the PCEA layer or areas as described above, the suspended endothermic agent may need to be further sealed and secured inside the carrier matrix to prevent seeping and leakage even before assembly of the thermal liner. This sealing is accomplished by securing to the PCEA sealing layers by various means such as heat sealing, adhesives, lamination, chemical coating, by the film's own inherent tackiness generated by certain PCEA curing conditions or by any other contact and securing means well known in the art.

Figure 9:
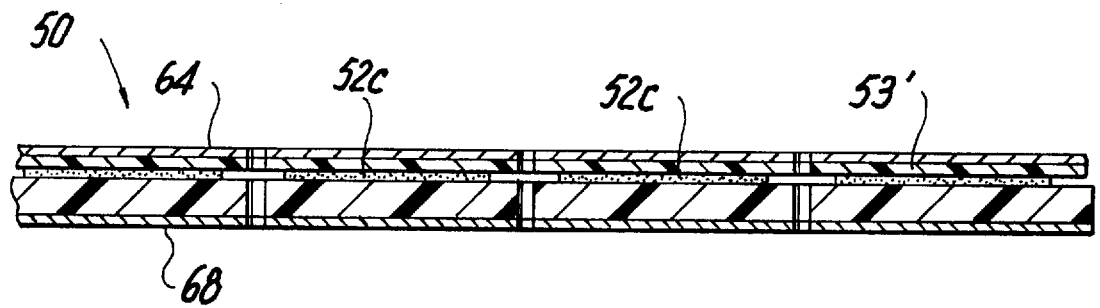
FIG. 9 is a side, cross-sectional view of the composite PCEA film, as shown in FIG. 8, where the top sealing layer and the bottom surface of the composite PCEA film is in direct contact with thermally conducting metal foils or films.

The sealing layers may comprise polymers, plastics, metals, metallicized polymers or other sealing materials well known in the art. FIG. 9 illustrates this new combination by building upon FIG. 7, whereupon sealing layers 53 are shown in contact with each respective side of the PCEA 52 of the inventive thermal barrier 50.

The sealing layers 53 are substantially free of any endothermic agent 52b. This creates a barrier between the carrier matrix 52a containing the endothermic agent 52b of the PCEA and the surrounding environment. As an example, in the case of plastic or polymer sealing and structural layers 53, when the carrier polymer 52a is fluoroelastomer, the fluoroelastomer PCEA would preferably be sandwiched between two layers of fluoropolymer (PTFE, PFA OR FEP-TEFLONE), polyamide film or any possible combination thereof. Alternatively, if the carrier polymer 52a is KAPTON®, MYLAR®, polyethylene, polypropylene, acrylic, or other polymers well known in the art, the PCEA would be sandwiched between at least two layers of TEFLONE, SILICONE, or other polymers referenced above, and which are well known in the art as being chemically and thermally resistant. These sealing layers 53 of polymer or plastic may be either identical to or different in nature from the carrier plastic or polymer 52a of the PCEA.

The preferred material for the sealing layers 53 for use in a fire fighter's garment is TEFLON or a similar fluorinated hydrocarbon film well known to those skilled in the art.

(iv) When the inventive thermal liner used in fire fighters garments is a film, it becomes almost imperative to prevent any uneven heating of or any creation of "hot spots" in the garment. This can be accomplished by contacting the sealing with a thermally conductive material (See FIG. 9). This thermally conductive material will improve the conductance of heat to the endothermic agent 52b in the thermal liner's PCEA layer significantly and will help distribute and dissipate high temperature fluxes, thereby avoiding uneven heating of the inventive thermal liner. Alternatively, it will allow for the transfer and dissipation of heat along the PCEA patches or segments.

As shown in FIG. 9, the PCEA liner described above is sandwiched by two thermally conductive layers 53. These thermally conductive layers can be one layer of metal, multiple layers of metal, or a metal coated polymer layer, a thermally conductive graphite fabric, TIVAR®, FIBERGLASS®, SPECTRA® or GOREX®. Some of these thermally conductive layers can be further modified by the utilization of different metal and non-metal coatings such as aluminum, copper or others well known in the art; or by thermally conductive nonmetal coatings such as silicate, carbon (diamond or graphite), or other nonmetal materials well known in the art. For the sake of convenience and clarity these metallicized thermally conductive layers will be referred to as 53'.

Preferably, for fire fighters' garments using a PCEA film where the PCEA is trapped between two layers of metallicized thermally conductive layers, the metal of the thermally conductive layers 53' is aluminum.

The metallicized polymer sheets that can form thermally conductive layers 53' are manufactured by Dow Chemical Company or DuPont Chemical Company and may be obtained from Acton Industries, Inc. of Pittsburgh Pa. These sheets are typically ordered by description and should preferably have a thickness of 0.1 to 5 mils of PFA, FEP or PTFE TEFLON as flexible films.

When the thermally conductive layers are made of metal or metallicized polymer, the improved conductance and distribution of heat to the suspended endothermic agent in the PCEA effectively renders the liner as the best liner for fire fighting suits.

(v) The PCEA film and the sealing layers 44 or 44' used in the above examples of the inventive thermal liner for fire fighting garments may be rendered even more flame resistant by surface coating or suspending in them flame retardant chemicals such as boric acid, perfluorooctylbromide, perfluorodecylbromide, polybromine diphenyl ether (PBDE), tetrabrombisphenol-A (TBBPA) or other flame retardant chemical coatings well known to those skilled in the art.

Figure 10:
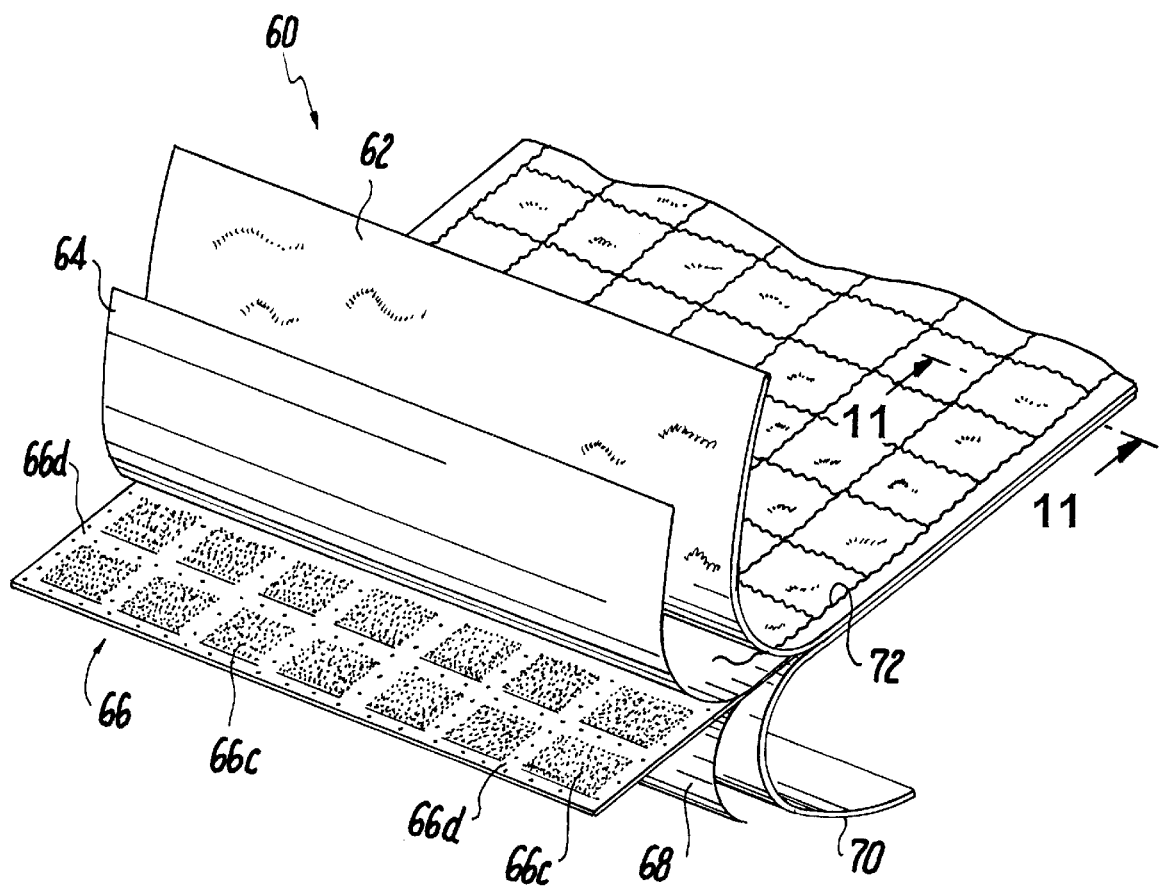
FIG. 10 is a perspective view of one particular application of the present invention as a quilted, multilayered endothermic liner.
Figure 11:
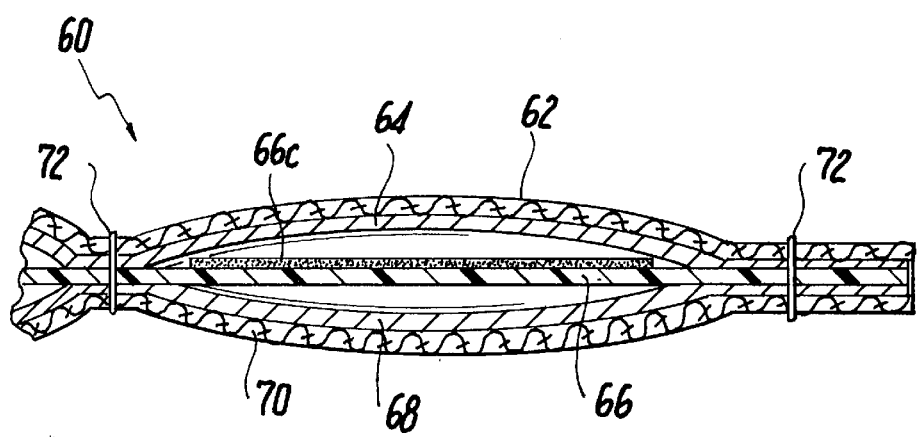
FIG. 11 is a side, cross-sectional view of the multilayered material as shown in FIG. 10.
Figure 12:
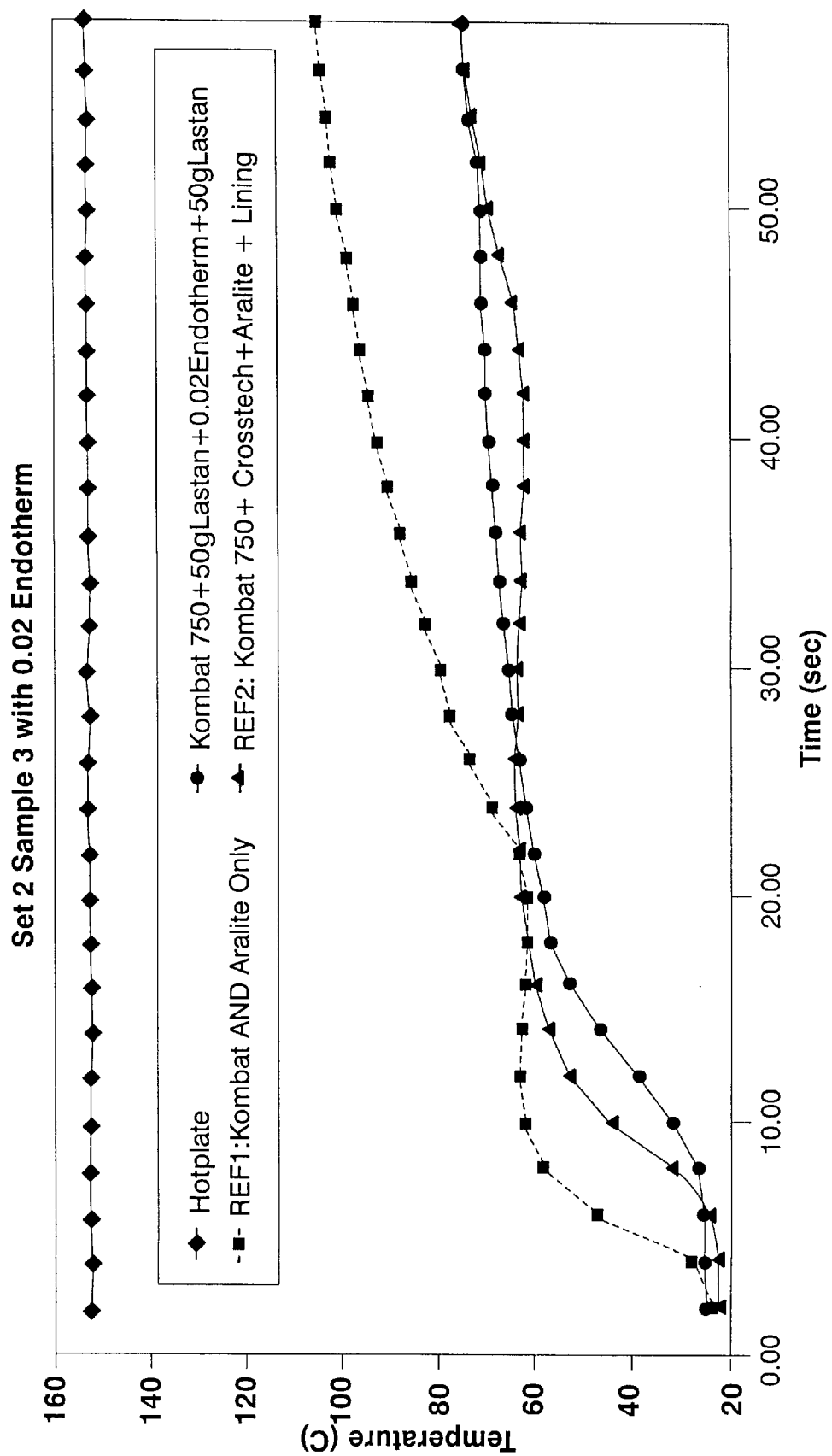
FIGS. 12–15 are graphs, which show thermal test results of endotherms at 0.01 and 0.02 concentrations used with various insulations and KOMBAT 750.
Figure 13:
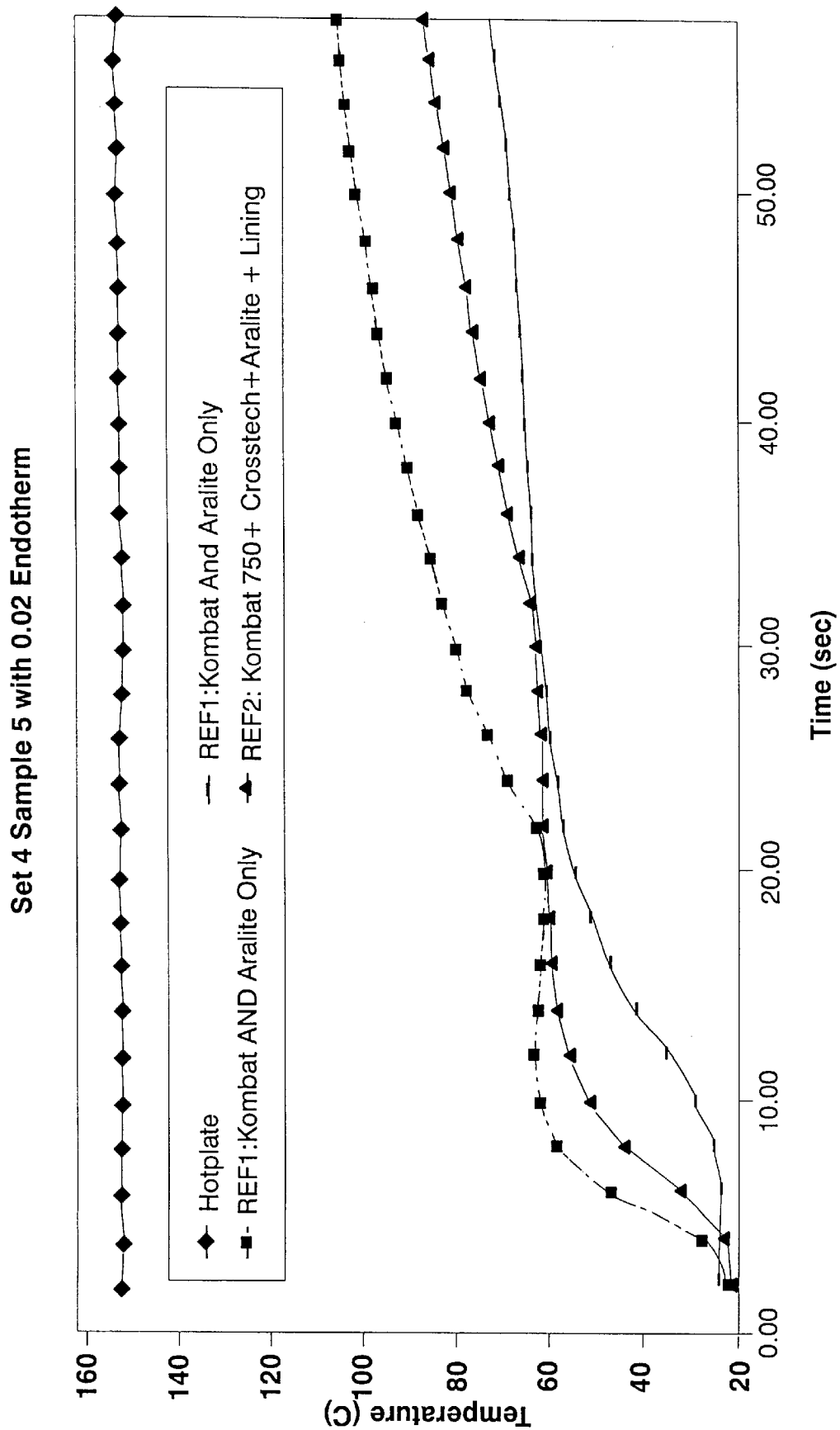

(vi) FIG. 10 and FIG. 11 show a perspective view and a simple cross section respectively of another variation of the inventive thermal liner. This thermal liner 60 comprises a first layer of very thin insulation 62 adjacent to a first sealing layer which may or may not be metallicized 64; the first sealing layer in turn is attached to the PCEA layer 66 wherein the PCEA is distributed in discrete, defined areas 66c leaving narrow paths 66d running between the defined areas 66c, which are substantially free of the PCEA; the PCEA layer 66 in turn is attached to a second sealing layer 68 which may or may not be metallicized on at least one side and which sealing layer 68 is then adjacent to a second very thin layer of insulation or face cloth 70. All five layers may be held together by means of a series of or a continuous quilting stitch 72, which is preferably placed right onto the defined narrow paths 66d running between the defined PCEA areas 66c.

This first insulation layer 62 helps to prevent direct contact between the skin of a wearer, and the potentially hot sealing layer 64. It also helps wick away moisture from the wearer's skin, thereby making it more comfortable to wear. This can be important because sealing layers 64 made of metal or metallicized polymer will not pass significant moisture (unless perforated), as evident from their water vapor transmission constants. Finally the insulation layer 62 further provides a temperature gradient between the wearer and the heat absorbent PCEA layer 66 and together with the rest of the materials, help increase the tear or shear strength of the thermal liner.

The insulation layers 62 and 70 are preferably made of LASTAN, KEVLAR, NOMEX, polyimides, carbon fabric or battings, high density fibers of TIVAR and SPECTRA or other material well known to those skilled in the art.

The quilting process, which is well known in the art, is usually performed by sewing machine that quickly punctures and pushes a flame resistant quilting thread through the multilayered liner thereby securing the layers described.

The embodiments described above are directed to thermal protective liners, which are permanent, i.e They form a permanent component of the thermal protective garment, and more particularly of the firesuit and their endotherm is recyclable. However, as pointed out earlier in the present specification, thermal liners can also be disposable, i.e they form a removable component of the thermal protective garment and their endotherm is consumed during use under high heat conditions. Accordingly, disposable thermal liners can be either external i.e. coveralls or internally mounted on the suit and the carrier plastic or polymer may be a plastic material as described above, cotton, cellulose, paper or wood shavings.

Initial testing of a prototype of thermal control liner formed in accordance with the above, clearly showed the superiority of a liner having the PCEA in it, when compared to a thermal liner that did not. Specifically, the PCEA thermal liner prototype comprised: a first layer of a KOMBAT 750 and ARALITE batting followed by a moisture barrier, which in turn was followed by a third PCEA layer, which in turn was followed by an aluminized layer.

The PCEA thermal liner prototype was compared to thermal control material which comprised a first layer of KOMBAT 750 and ARALITE batting, followed by a moisture, which in turn was followed by an aluminized layer. Both thermal control materials were tested under extreme high heat conditions. Specifically, both were brought into contact with a 1000 Watt, 400 degree heater. It was found that the thermal control material without the PCEA reached 175 degrees Fahrenheit in 2.5 minutes, whereas the PCEA thermal control material reached 101 degrees Fahrenheit in 8 minutes.

When the thermal control material was modified to form a very thin wearable prototype liner containing a 1.0 mil thick PCEA film in a firefighter's garment, it underwent UL testing. Such testing indicated that the inventive thermal control material had a Thermal Protective Performance (TPP) of 53 in an insulation 0.66, the thickness of ARALITE Batting. Specifically, the U.L. report stated as follows:

TPP

Outer shell—SM Kombat 750

Moisture Barrier—Gore Crosstech Pajama Check

Thermal Barrier—Hayes Lastan 50 without backing.

As Received—TPP=51.6

After Wash—TPP=53.1

In order to form the liner an endotherm liner i.e. a PCEA liner for temperature control was integrated into a firesuit which comprised an outer layer of KOMBAT 750, a vapor barrier and an insulation liner of half the thickness of ARALITE polyamide insulation. The Endothermic liner was a thin 1.2 mil film with a high 2D planar or surface thermal conductivity, a low thermal conductivity in the direction orthogonal to the surface plane and a relatively high recyclable heat capacity. These factors are variable allowing for design specification relative to need. Very high heat capacities on the order of 400 cal/gm are also specifiable in a low cost disposable outer material to line or lay on the KOMBAT 750 outer surface as a coverall or an outer PCEA garment in situations where the wearer may be exposed to flashback conditions and/or electrical arching.

It is also possible to manufacture a thermally protective PCEA film with an insulation weight of 0.75 oz/sq. yd of each side and a film thickness of 0.6 mils to provide a liner with a weight less than ARALITE and a thickness of 0.5 that of ARALITE. To increase the TPP value above 60, one only needs to add an additional 0.03 gram of endotherm per sq. inch. To improve breathability, one may manipulate the number and size of endotherm patches and change the number of holes per unit of surface area. The manipulation of the size of patches can also improve flame test results while not significantly impacting TPP.

FIG. 12–15 are charts, which show thermal test results of endotherms at 0.01 and 0.02 g/sq. inch concentrations used with various insulations and KOMBAT 750. The insulations include ARALITE, CROSSTECH, LASTAN 50 and LASTAN 70.

Figure 14:
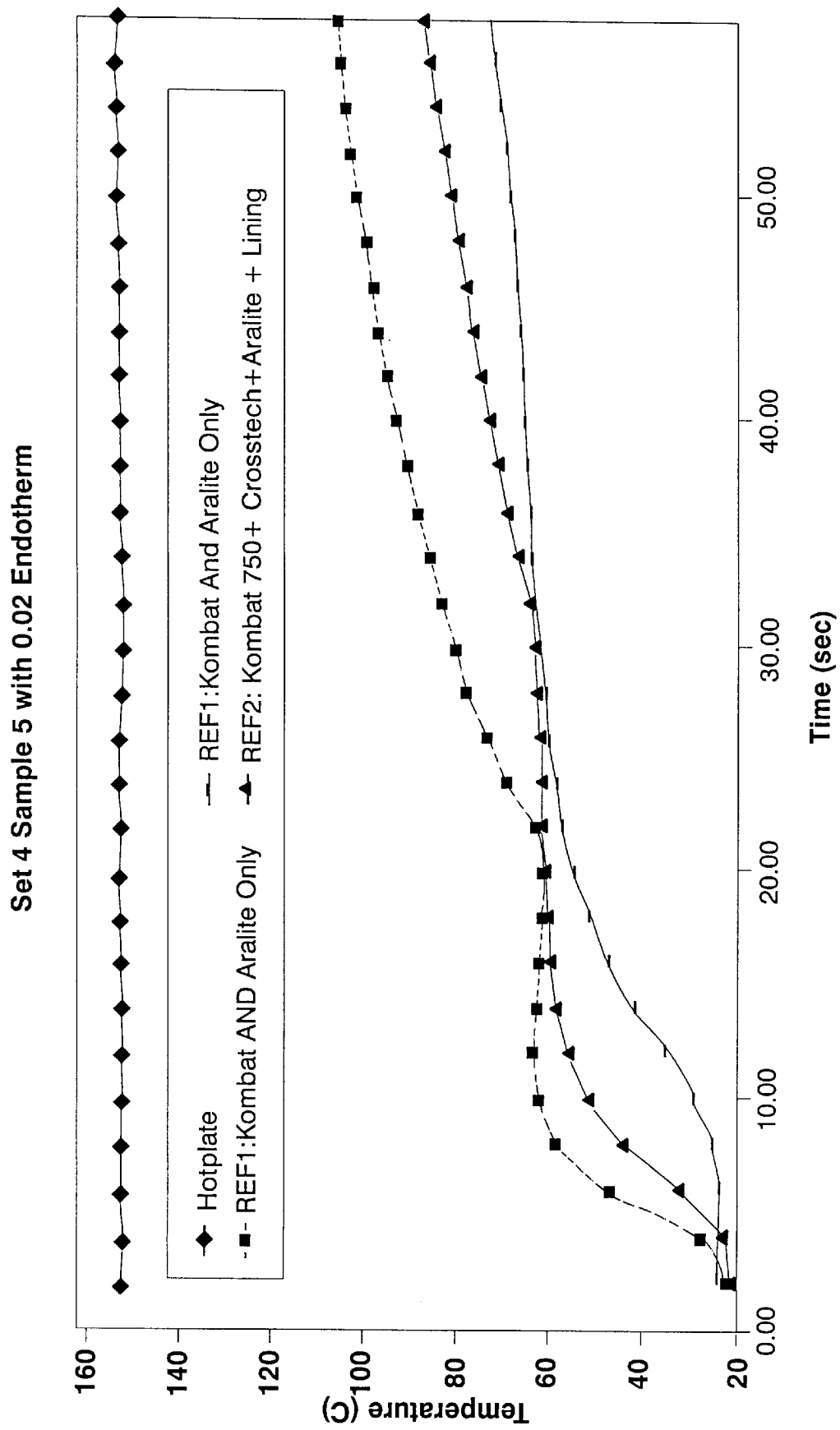
Figure 15:
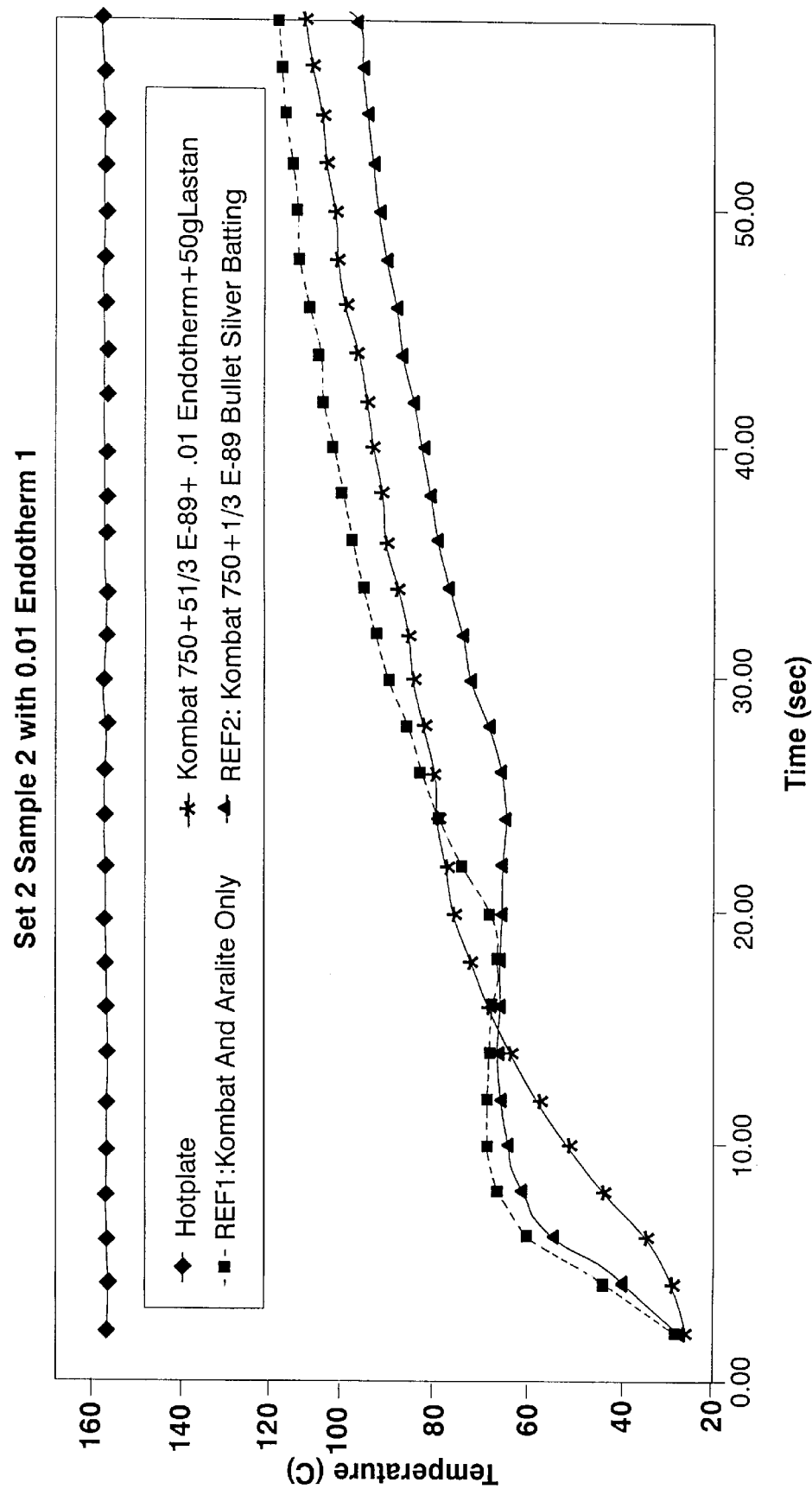
Figure 16:
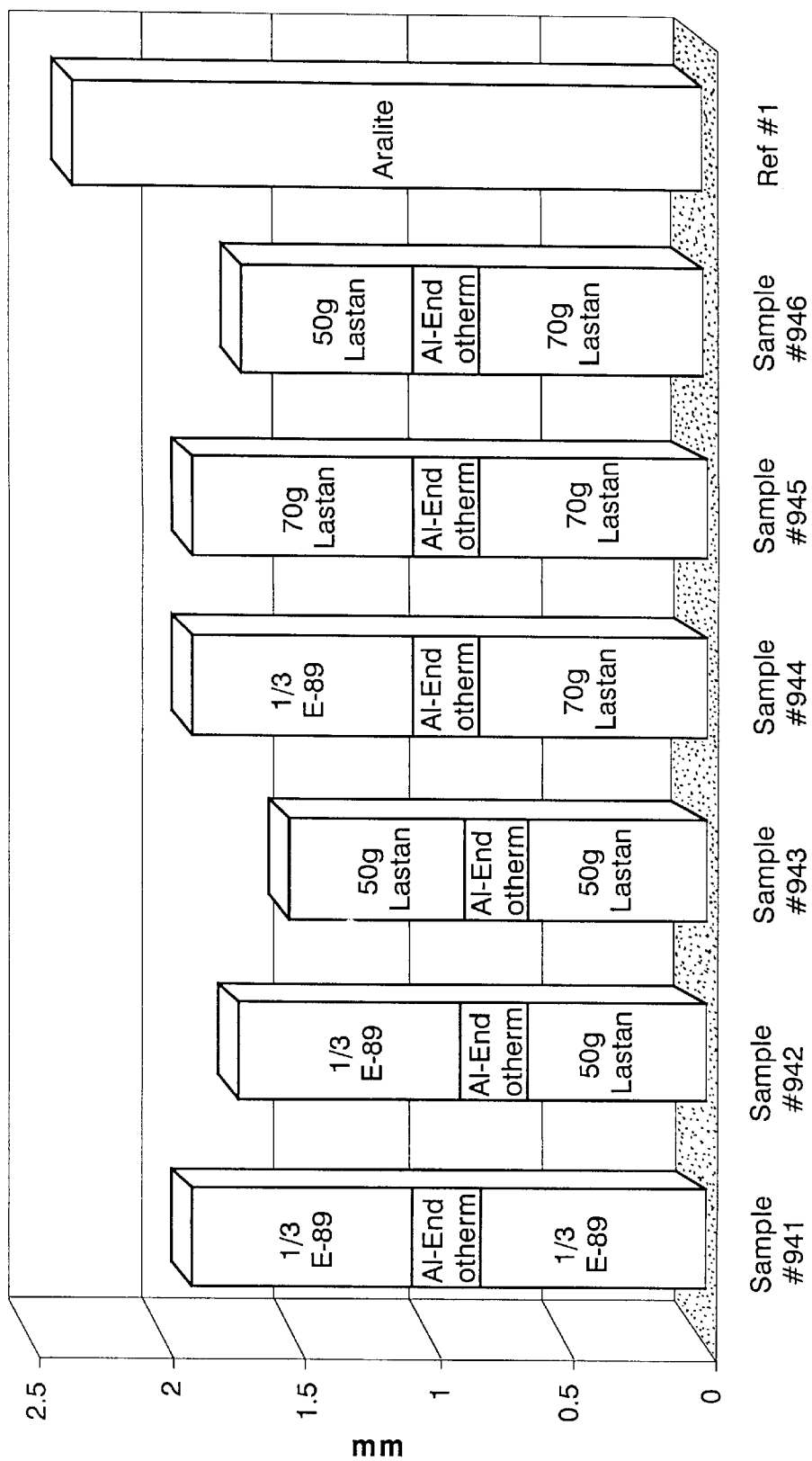
FIG. 16 is a bar graph, which shows the thickness of specified combinations of insulation and endotherm liner.

FIG. 14 is a bar graph which shows the thickness of specified combinations of insulation and endotherm liner, relative to a standard firesuit liners of KOMBAT 750 aralite batting.

Of course, the present inventive thermal liner has been illustrated in connection with fire fighters' garments since this is the most obvious application. However, it is clearly evident that the technology of the liner described above can be used in any situation where a thermo-protective material of this type is needed; including in situations where it is necessary to provide protection against hazardous materials and chemical agents.

What is claimed is:

1. A thermally protective liner for use with thermally protective garments comprising a polymer and an endothermic agent distributed, dispersed and suspended within said polymer, said endothermic agent being capable of absorbing amounts of heat equivalent to its latent heat of reaction or fusion, whereby the thermal protective performance of said garments is increased and enhanced.

2. The thermally protective liner of claim 1, wherein the form of said endothermic agent distributed, dispersed and suspended within said polymer is selected from the group of forms consisting of a film, a composite film, a spun cloth, a woven cloth, a knitted cloth, a cloth made from non-woven means, a fiber/insulation composite, and any combination thereof.

3. The thermally protective liner of claim 1 further comprising at least one sealing layer.

4. The thermally protective liner of claim 2 further comprising at least one sealing layer.

5. The thermally protective liner of claim 1 further comprising at least one thermally conductive layer.

6. The thermally protective liner of claim 2, further comprising at least one thermally conductive layer.

7. The thermally protective liner of claim 3, further comprising at least one thermally conductive layer.

8. The thermally protective liner of claim 4 further comprising at least one thermally conductive layer.

9. The thermally protective liner of claim 1, wherein the polymer is chosen from the group of polymers consisting of natural and synthetic polymers or a mixture thereof.

10. The thermally protective liner of claim 2, wherein the polymer is chosen from the group of polymers consisting of natural and synthetic polymers or a mixture thereof.

11. The thermally protective liner of claim 3, wherein the polymer is chosen from the group of polymers consisting of natural and synthetic polymers or a mixture thereof.

12. The thermally protective liner of claim 4, wherein the polymer is chosen from the group of polymers consisting of natural and synthetic polymers or a mixture thereof.

13. The thermally protective liner of claim 5, wherein the polymer is chosen from the group of polymers consisting of natural and synthetic polymers or a mixture thereof.

14. The thermally protective liner of claim 6, wherein the polymer is chosen from the group of polymers consisting of natural and synthetic polymers or a mixture thereof.

15. The thermally protective liner of claim 7, wherein the polymer is chosen from the group of polymers consisting of natural and synthetic polymers or a mixture thereof.

16. The thermally protective liner of claim 8, wherein the polymer is chosen from the group of polymers consisting of natural and synthetic polymers or a mixture thereof.

17. The thermally protective liner of claim 1, wherein the polymer is chosen from the group of polymers consisting of latexes, fluoropolymers, TEFLON® polytetrafluoroethylene, polyfluoroacetate, fluoroethylpropylene, high temperature fluoroelastomers, VITON®, highly thermoresistant polymers, highly thermoresistant plastics, elastomers, SILICONE®, polydimethylsiloxane, polymethylphenylsiloxane siloxanes, polyimides, KAPTON®, POLYESTERS®, MYLAR®, high density polymers, TIVAR®, SPECTRA®, polyamides, polyarylates, polyetherimides, polyketones, polyphenylene oxides, polyphenylene sulfides, polyphenylsulfones, polysulfones, acetals, nylons, ABS, polyetheretherketones, phenolics, polystyrenes, polycarbonates, polyethylenes, polypropylenes, acrylics, polyurethanes, polyvinyls, polyvinylchlorides, and cellulose, KAPTON®, MYLAR®, and any combination thereof.

18. The thermally protective liner of claim 2, wherein the polymer is chosen from the group of polymers consisting of latexes, fluoropolymers, TEFLON® polytetrafluoroethylene, polyfluoroacetate, fluoroethylpropylene, high temperature fluoroelastomers, VITON®, highly thermoresistant polymers, highly thermoresistant plastics, elastomers, SILICONE®, polydimethylsiloxane, polymethylphenylsiloxane siloxanes, polyimides, KAPTON®, POLYESTERS®, MYLAR®, high density polymers, TIVAR®, SPECTRA®, polyamides, polyarylates, polyetherimides, polyketones, polyphenylene oxides, polyphenylene sulfides, polyphenylsulfones, polysulfones, acetals, nylons, ABS, polyetheretherketones, phenolics, polystyrenes, polycarbonates, polyethylenes, polypropylenes, acrylics, polyurethanes, polyvinyls, polyvinylchlorides, and cellulose, KAPTON®, MYLAR®, and any combination thereof.

19. The thermally protective liner of claim 3, wherein the polymer is chosen from the group of polymers consisting of latexes, fluoropolymers, TEFLON® polytetrafluoroethylene, polyfluoroacetate, fluoroethylpropylene, high temperature fluoroelastomers, VITON®, highly thermoresistant polymers, highly thermoresistant plastics, elastomers, SILICONE®, polydimethylsiloxane, polymethylphenylsiloxane siloxanes, polyimides, KAPTON®, POLYESTERS®, MYLAR®, high density polymers, TIVAR®, SPECTRA®, polyamides, polyarylates, polyetherimides, polyketones, polyphenylene oxides, polyphenylene sulfides, polyphenylsulfones, polysulfones, acetals, nylons, ABS, polyetheretherketones, phenolics, polystyrenes, polycarbonates, polyethylenes, polypropylenes, acrylics, polyurethanes, polyvinyls, polyvinylchlorides, and cellulose, KAPTON®, MYLAR®, and any combination thereof.

20. The thermally protective liner of claim 4, wherein the polymer is chosen from the group of polymers consisting of latexes, fluoropolymers, TEFLON® polytetrafluoroethylene, polyfluoroacetate, fluoroethylpropylene, high temperature fluoroelastomers, VITON®, highly thermoresistant polymers, highly thermoresistant plastics, elastomers, SILICONE®, polydimethylsiloxane, polymethylphenylsiloxane siloxanes, polyimides, KAPTON®, POLYESTERS®, MYLAR®, high density polymers, TIVAR®, SPECTRA®, polyamides, polyarylates, polyetherimides, polyketones, polyphenylene oxides, polyphenylene sulfides, polyphenylsulfones, polysulfones, acetals, nylons, ABS, polyetheretherketones, phenolics, polystyrenes, polycarbonates, polyethylenes, polypropylenes, acrylics, polyurethanes, polyvinyls, polyvinylchlorides, and cellulose, KAPTON®, MYLAR®, and any combination thereof.

21. The thermally protective liner of claim 5, wherein the polymer is chosen from the group of polymers consisting of latexes, fluoropolymers, TEFLON® polytetrafluoroethylene, polyfluoroacetate, fluoroethylpropylene, high temperature fluoroelastomers, VITON®, highly thermoresistant polymers, highly thermoresistant plastics, elastomers, SILICONE®, polydimethylsiloxane, polymethylphenylsiloxane siloxanes, polyimides, KAPTON®, POLYESTERS®, MYLAR®, high density polymers, TIVAR®, SPECTRA®, polyamides, polyarylates, polyetherimides, polyketones, polyphenylene oxides, polyphenylene sulfides, polyphenylsulfones, polysulfones, acetals, nylons, ABS, polyetheretherketones, phenolics, polystyrenes, polycarbonates, polyethylenes, polypropylenes, acrylics, polyurethanes, polyvinyls, polyvinylchlorides, and cellulose, KAPTON®, MYLAR®, and any combination thereof.

22. The thermally protective liner of claim 6, wherein the polymer is chosen from the group of polymers consisting of latexes, fluoropolymers, TEFLON® polytetrafluoroethylene, polyfluoroacetate, fluoroethylpropylene, high temperature fluoroelastomers, VITON®, highly thermoresistant polymers, highly thermoresistant plastics, elastomers, SILICONE®, polydimethylsiloxane, polymethylphenylsiloxane siloxanes, polyimides, KAPTON®, POLYESTERS®, MYLAR®, high density polymers, TIVAR®, SPECTRA®, polyamides, polyarylates, polyetherimides, polyketones, polyphenylene oxides, polyphenylene sulfides, polyphenylsulfones, polysulfones, acetals, nylons, ABS, polyetheretherketones, phenolics, polystyrenes, polycarbonates, polyethylenes, polypropylenes, acrylics, polyurethanes, polyvinyls, polyvinylchlorides, and cellulose, KAPTON®, MYLAR®, and any combination thereof.

23. The thermally protective liner of claim 7, wherein the polymer is chosen from the group of polymers consisting of latexes, fluoropolymers, TEFLON® polytetrafluoroethylene, polyfluoroacetate, fluoroethylpropylene, high temperature fluoroelastomers, VITON®, highly thermoresistant polymers, highly thermoresistant plastics, elastomers, SILICONE®, polydimethylsiloxane, polymethylphenylsiloxane siloxanes, polyimides, KAPTON®, POLYESTERS®, MYLAR®, high density polymers, TIVAR®, SPECTRA®, polyamides, polyarylates, polyetherimides, polyketones, polyphenylene oxides, polyphenylene sulfides, polyphenylsulfones, polysulfones, acetals, nylons, ABS, polyetheretherketones, phenolics, polystyrenes, polycarbonates, polyethylenes, polypropylenes, acrylics, polyurethanes, polyvinyls, polyvinylchlorides, and cellulose, KAPTON®, MYLAR®, and any combination thereof.

24. The thermally protective liner of claim 8, wherein the polymer is chosen from the group of polymers consisting of latexes, fluoropolymers, TEFLON® polytetrafluoroethylene, polyfluoroacetate, fluoroethylpropylene, high temperature fluoroelastomers, VITON®, highly thermoresistant polymers, highly thermoresistant plastics, elastomers, SILICONE®, polydimethylsiloxane, polymethylphenylsiloxane siloxanes, polyimides, KAPTON®, POLYESTERS®, MYLAR®, high density polymers, TIVAR®, SPECTRA®, polyamides, polyarylates, polyetherimides, polyketones, polyphenylene oxides, polyphenylene sulfides, polyphenylsulfones, polysulfones, acetals, nylons, ABS, polyetheretherketones, phenolics, polystyrenes, polycarbonates, polyethylenes, polypropylenes, acrylics, polyurethanes, polyvinyls, polyvinylchlorides, and cellulose, KAPTON®, MYLAR®, and any combination thereof.

25. The thermally protective liner of claim 1 further comprising a fire retardant.

26. The thermally protective liner of claim 1, wherein the endotherm is selected from the group of endotherms consisting of oxidized and unoxidized polymers, oxidized and unoxidized homopolymers of ethylene polymer compounds, carbon monoxide-bonded copolymers, micronized polyethylene waxes, stearic acid, waxes derived from petroleum, ethylene-bis-stearamide, N,N-ethylene-bis-stearamide, tars, high molecular weight oils and hydrocarbons, polyvinyl alcohols; oxidized and unoxidized polyethylene homopolymers, carnauba wax, aluminum hydroxide, calcium hydroxide, potassium hydroxide, lithium hydroxide, boric acid, dodecaborane, paraldehyde, paraformaldehyde, trioxane, lithium formate, lithium acetate, lithium carbonate, calcium carbonate, silicon carbonate, magnesium carbonate, sodium bicarbonate, salts of acetic acid, salts of formic acid, salts of boric acid, lithium chloride trihydrate, lithium nitrate trihydrate, sodium carbonate decahydrate, sodium borate decahydrate, hydrated epsom salts, magnesium nitrate hexahydrate, beryllium sulfate tetrahydrate, sodium phosphate dodecahydrate, calcium chloride hexahydrate, zinc sulfate heptahydrate, magnesium chloride hexahydrate, sodium sulfate decahydrate, aluminum oxide trihydrate, aluminum sulfate decaoctahydrate, aluminum fluoride trihydrate, and any eutectic mixtures of any of these materials or families of materials including salts with melting points below 550 degrees Celsius.

27. The thermally protective liner of claim 2, wherein the endotherm is selected from the group of endotherms consisting of oxidized and unoxidized polymers, oxidized and unoxidized homopolymers of ethylene polymer compounds, carbon monoxide-bonded copolymers, micronized polyethylene waxes, stearic acid, waxes derived from petroleum, ethylene-bis-stearamide, N,N-ethylene-bis-stearamide, tars, high molecular weight oils and hydrocarbons, polyvinyl alcohols; oxidized and unoxidized polyethylene homopolymers, carnauba wax, aluminum hydroxide, calcium hydroxide, potassium hydroxide, lithium hydroxide, boric acid, dodecaborane, paraldehyde, paraformaldehyde, trioxane, lithium formate, lithium acetate, lithium carbonate, calcium carbonate, silicon carbonate, magnesium carbonate, sodium bicarbonate, salts of acetic acid, salts of formic acid, salts of boric acid, lithium chloride trihydrate, lithium nitrate trihydrate, sodium carbonate decahydrate, sodium borate decahydrate, hydrated epsom salts, magnesium nitrate hexahydrate, beryllium sulfate tetrahydrate, sodium phosphate dodecahydrate, calcium chloride hexahydrate, zinc sulfate heptahydrate, magnesium chloride hexahydrate, sodium sulfate decahydrate, aluminum oxide trihydrate, aluminum sulfate decaoctahydrate, aluminum fluoride trihydrate, and any eutectic mixtures of any of these materials or families of materials including salts with melting points below 550 degrees Celsius.

28. The thermally protective liner of claim 3, wherein the endotherm is selected from the group of endotherms consisting of oxidized and unoxidized polymers, oxidized and unoxidized homopolymers of ethylene polymer compounds, carbon monoxide-bonded copolymers, micronized polyethylene waxes, stearic acid, waxes derived from petroleum, ethylene-bis-stearamide, N,N-ethylene-bis-stearamide, tars, high molecular weight oils and hydrocarbons, polyvinyl alcohols; oxidized and unoxidized polyethylene homopolymers, carnauba wax, aluminum hydroxide, calcium hydroxide, potassium hydroxide, lithium hydroxide, boric acid, dodecaborane, paraldehyde, paraformaldehyde, trioxane, lithium formate, lithium acetate, lithium carbonate, calcium carbonate, silicon carbonate, magnesium carbonate, sodium bicarbonate, salts of acetic acid, salts of formic acid, salts of boric acid, lithium chloride trihydrate, lithium nitrate trihydrate, sodium carbonate decahydrate, sodium borate decahydrate, hydrated epsom salts, magnesium nitrate hexahydrate, beryllium sulfate tetrahydrate, sodium phosphate dodecahydrate, calcium chloride hexahydrate, zinc sulfate heptahydrate, magnesium chloride hexahydrate, sodium sulfate decahydrate, aluminum oxide trihydrate, aluminum sulfate decaoctahydrate, aluminum fluoride trihydrate, and any eutectic mixtures of any of these materials or families of materials including salts with melting points below 550 degrees Celsius.

29. The thermally protective liner of claim 4, wherein the endotherm is selected from the group of endotherms consisting of oxidized and unoxidized polymers, oxidized and unoxidized homopolymers of ethylene polymer compounds, carbon monoxide-bonded copolymers, micronized polyethylene waxes, stearic acid, waxes derived from petroleum, ethylene-bis-stearamide, N,N-ethylene-bis-stearamide, tars, high molecular weight oils and hydrocarbons, polyvinyl alcohols; oxidized and unoxidized polyethylene homopolymers, carnauba wax, aluminum hydroxide, calcium hydroxide, potassium hydroxide, lithium hydroxide, boric acid, dodecaborane, paraldehyde, paraformaldehyde, trioxane, lithium formate, lithium acetate, lithium carbonate, calcium carbonate, silicon carbonate, magnesium carbonate, sodium bicarbonate, salts of acetic acid, salts of formic acid, salts of boric acid, lithium chloride trihydrate, lithium nitrate trihydrate, sodium carbonate decahydrate, sodium borate decahydrate, hydrated epsom salts, magnesium nitrate hexahydrate, beryllium sulfate tetrahydrate, sodium phosphate dodecahydrate, calcium chloride hexahydrate, zinc sulfate heptahydrate, magnesium chloride hexahydrate, sodium sulfate decahydrate, aluminum oxide trihydrate, aluminum sulfate decaoctahydrate, aluminum fluoride trihydrate, and any eutectic mixtures of any of these materials or families of materials including salts with melting points below 550 degrees Celsius.

30. The thermally protective liner of claim 5, wherein the endotherm is selected from the group of endotherms consisting of oxidized and unoxidized polymers, oxidized and unoxidized homopolymers of ethylene polymer compounds, carbon monoxide-bonded copolymers, micronized polyethylene waxes, stearic acid, waxes derived from petroleum, ethylene-bis-stearamide, N,N-ethylene-bis-stearamide, tars, high molecular weight oils and hydrocarbons, polyvinyl alcohols; oxidized and unoxidized polyethylene homopolymers, carnauba wax, aluminum hydroxide, calcium hydroxide, potassium hydroxide, lithium hydroxide, boric acid, dodecaborane, paraldehyde, paraformaldehyde, trioxane, lithium formate, lithium acetate, lithium carbonate, calcium carbonate, silicon carbonate, magnesium carbonate, sodium bicarbonate, salts of acetic acid, salts of formic acid, salts of boric acid, lithium chloride trihydrate, lithium nitrate trihydrate, sodium carbonate decahydrate, sodium borate decahydrate, hydrated epsom salts, magnesium nitrate hexahydrate, beryllium sulfate tetrahydrate, sodium phosphate dodecahydrate, calcium chloride hexahydrate, zinc sulfate heptahydrate, magnesium chloride hexahydrate, sodium sulfate decahydrate, aluminum oxide trihydrate, aluminum sulfate decaoctahydrate, aluminum fluoride trihydrate, and any eutectic mixtures of any of these materials or families of materials including salts with melting points below 550 degrees Celsius.

31. The thermally protective liner of claim 6, wherein the endotherm is selected from the group of endotherms consisting of oxidized and unoxidized polymers, oxidized and unoxidized homopolymers of ethylene polymer compounds, carbon monoxide-bonded copolymers, micronized polyethylene waxes, stearic acid, waxes derived from petroleum, ethylene-bis-stearamide, N,N-ethylene-bis-stearamide, tars, high molecular weight oils and hydrocarbons, polyvinyl alcohols; oxidized and unoxidized polyethylene homopolymers, carnauba wax, aluminum hydroxide, calcium hydroxide, potassium hydroxide, lithium hydroxide, boric acid, dodecaborane, paraldehyde, paraformaldehyde, trioxane, lithium formate, lithium acetate, lithium carbonate, calcium carbonate, silicon carbonate, magnesium carbonate, sodium bicarbonate, salts of acetic acid, salts of formic acid, salts of boric acid, lithium chloride trihydrate, lithium nitrate trihydrate, sodium carbonate decahydrate, sodium borate decahydrate, hydrated epsom salts, magnesium nitrate hexahydrate, beryllium sulfate tetrahydrate, sodium phosphate dodecahydrate, calcium chloride hexahydrate, zinc sulfate heptahydrate, magnesium chloride hexahydrate, sodium sulfate decahydrate, aluminum oxide trihydrate, aluminum sulfate decaoctahydrate, aluminum fluoride trihydrate, and any eutectic mixtures of any of these materials or families of materials including salts with melting points below 550 degrees Celsius.

32. The thermally protective liner of claim 7, wherein the endotherm is selected from the group of endotherms consisting of oxidized and unoxidized polymers, oxidized and unoxidized homopolymers of ethylene polymer compounds, carbon monoxide-bonded copolymers, micronized polyethylene waxes, stearic acid, waxes derived from petroleum, ethylene-bis-stearamide, N,N-ethylene-bis-stearamide, tars, high molecular weight oils and hydrocarbons, polyvinyl alcohols; oxidized and unoxidized polyethylene homopolymers, carnauba wax, aluminum hydroxide, calcium hydroxide, potassium hydroxide, lithium hydroxide, boric acid, dodecaborane, paraldehyde, paraformaldehyde, trioxane, lithium formate, lithium acetate, lithium carbonate, calcium carbonate, silicon carbonate, magnesium carbonate, sodium bicarbonate, salts of acetic acid, salts of formic acid, salts of boric acid, lithium chloride trihydrate, lithium nitrate trihydrate, sodium carbonate decahydrate, sodium borate decahydrate, hydrated epsom salts, magnesium nitrate hexahydrate, beryllium sulfate tetrahydrate, sodium phosphate dodecahydrate, calcium chloride hexahydrate, zinc sulfate heptahydrate, magnesium chloride hexahydrate, sodium sulfate decahydrate, aluminum oxide trihydrate, aluminum sulfate decaoctahydrate, aluminum fluoride trihydrate, and any eutectic mixtures of any of these materials or families of materials including salts with melting points below 550 degrees Celsius.

33. The thermally protective liner of claim 8, wherein the endotherm is selected from the group of endotherms consisting of oxidized and unoxidized polymers, oxidized and unoxidized homopolymers of ethylene polymer compounds, carbon monoxide-bonded copolymers, micronized polyethylene waxes, stearic acid, waxes derived from petroleum, ethylene-bis-stearamide, N,N-ethylene-bis-stearamide, tars, high molecular weight oils and hydrocarbons, polyvinyl alcohols; oxidized and unoxidized polyethylene homopolymers, carnauba wax, aluminum hydroxide, calcium hydroxide, potassium hydroxide, lithium hydroxide, boric acid, dodecaborane, paraldehyde, paraformaldehyde, trioxane, lithium formate, lithium acetate, lithium carbonate, calcium carbonate, silicon carbonate, magnesium carbonate, sodium bicarbonate, salts of acetic acid, salts of formic acid, salts of boric acid, lithium chloride trihydrate, lithium nitrate trihydrate, sodium carbonate decahydrate, sodium borate decahydrate, hydrated epsom salts, magnesium nitrate hexahydrate, beryllium sulfate tetrahydrate, sodium phosphate dodecahydrate, calcium chloride hexahydrate, zinc sulfate heptahydrate, magnesium chloride hexahydrate, sodium sulfate decahydrate, aluminum oxide trihydrate, aluminum sulfate decaoctahydrate, aluminum fluoride trihydrate, and any eutectic mixtures of any of these materials or families of materials including salts with melting points below 550 degrees Celsius.

34. A thermally protective garment comprising a thermal protective liner made of an endotherm dispersed, distributed and suspended within a polymer, said endotherm having heat absorbing qualities which increase and enhance the thermal protective performance of said garment.

35. The thermally protective garment of claim 34, wherein the form of said thermal protective liner is selected from the group of forms consisting of a film, a composite film, a spun cloth, a woven cloth, a knitted cloth, a cloth made from non-woven means, a fiber/insulation composite, and any combination thereof.

36. The thermally protective garment of claim 34, wherein the thermal protective liner further comprises at least one sealing layer.

37. The thermally protective garment of claim 35, wherein the thermal protective liner further comprises at least one sealing layer.

38. The thermally protective garment of claim 34, wherein the thermal protective liner further comprises at least one thermally conductive layer.

39. The thermally protective garment of claim 35, wherein the thermal liner further comprises at least one thermally conductive layer.

40. A relatively light weight, relatively thin protective garment providing protection from high ambient temperatures comprising a thermal protective layer having an endotherm distributed, dispersed and suspended within a polymer, said endotherm having heat absorbing qualities which increase and enhance said protection.

41. The thermally protective garment of claim 40, wherein the form of said thermal protective layer is selected from the group of forms consisting of a film, a composite film, a spun cloth, a woven cloth, a knitted cloth, a cloth made from non-woven means, a fiber/insulation composite, and any combination thereof.

42. The thermally protective garment of claim 40, wherein the thermal protective layer further comprises at least one sealing layer.

43. The thermally protective garment of claim 41, wherein the thermal protective layer further comprises at least one sealing layer.

44. The thermally protective garment of claim 40, wherein the thermal layer further comprises at least one thermally conductive layer.

45. The thermally protective garment of claim 41, wherein the thermal liner further comprises at least one thermally conductive layer.

46. The thermally protective garment of claim 40, wherein the thermal protective layer is mounted on the outside surface of said garment.

47. The thermally protective garment of claim 41, wherein the thermal protective layer is worn as a coverall, over said garment.

48. A protective firefighter's garment comprising:
   an outer shell made of an abrasion-resistant, flame and heat resistant material suitable for use in a firefighter garment; and
   a thermal protective layer proximately placed to said outer shell, said thermal protective layer having an endotherm distributed, dispersed and suspended within a polymer, said endotherm capable of absorbing heat equivalent to its latent heat of fusion or its latent heat of reaction, whereby the Thermal Protection Performance of said garment is increased and enhanced.

49. The protective firefighter's garment of claim 48, wherein the form of said thermal protective layer is selected from the group of forms consisting of a film, a composite film, a spun cloth, a woven cloth, a knitted cloth, a cloth made from non-woven means, a fiber/insulation composite, and any combination thereof.

50. The protective firefighter's garment of claim 48, wherein the thermal protective layer further comprises at least one sealing layer.

51. The protective firefighters' garment of claim 49, wherein the thermal protective layer further comprises at least one sealing layer.

52. The protective firefighters' garment of claim 48, wherein the thermal layer further comprises at least one thermally conductive layer.

53. The protective firefighters' garment of claim 49, wherein the thermal layer further comprises at least one thermally conductive layer.

54. The protective firefighter's garment of claim 48, wherein the thermal protective layer is mounted on the outside surface of said garment.

55. The protective firefighter's garment of claim 49, wherein the thermal protective layer is worn as a coverall, over said garment.

* * * * *